(12) United States Patent
Parazak

(10) Patent No.: US 6,281,267 B2
(45) Date of Patent: *Aug. 28, 2001

(54) INK TO INK BLEED AND HALO CONTROL USING SPECIFIC POLYMERS IN INK-JET PRINTING INKS

(75) Inventor: Dennis P. Parazak, Corvallis, OR (US)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/183,219

(22) Filed: Oct. 29, 1998

(51) Int. Cl.[7] .................. C09D 11/10; C08L 33/02; C08L 33/08; C08L 33/10; C08L 33/26
(52) U.S. Cl. .................. 523/160; 524/555; 524/560
(58) Field of Search .................. 523/160, 161; 106/31.6, 31.28; 526/318.1, 318.3, 318.44, 328.5, 329.7; 524/560, 555

(56) References Cited

U.S. PATENT DOCUMENTS

| | | | |
|---|---|---|---|
| 4,136,076 | 1/1979 | Daniels | 260/29.6 |
| 4,246,154 | * 1/1981 | Yao | 524/88 |
| 5,181,045 | 1/1993 | Shields et al. | 346/1.1 |
| 5,198,023 | 3/1993 | Stoffel | 106/22 R |
| 5,272,201 | 12/1993 | Ma et al. | 524/505 |
| 5,316,575 | 5/1994 | Lent et al. | 106/20 R |
| 5,320,668 | 6/1994 | Shields et al. | 106/20 R |
| 5,428,383 | 6/1995 | Shields et al. | 347/96 |
| 5,476,540 | 12/1995 | Shields et al. | 106/20 R |
| 5,488,402 | 1/1996 | Shields et al. | 347/96 |
| 5,518,534 | 5/1996 | Pearlstine et al. | 106/20 R |
| 5,536,306 | 7/1996 | Johnson et al. | 106/22 R |
| 5,536,761 | 7/1996 | Fujita | 523/160 |
| 5,555,008 | 9/1996 | Stoffel et al. | 347/100 |
| 5,596,027 | * 1/1997 | Mead et al. | 523/161 |
| 5,623,294 | 4/1997 | Takisawa et al. | 347/98 |
| 5,630,868 | * 5/1997 | Belmont et al. | 106/31.75 |
| 5,648,405 | * 7/1997 | Ma et al. | 523/160 |
| 5,679,143 | 10/1997 | Looman | 106/20 R |
| 5,695,820 | 12/1997 | Davis et al. | 427/261 |
| 5,696,182 | 12/1997 | Kashiwazaki et al. | 523/161 |
| 5,700,317 | 12/1997 | Adamic | 106/31.58 |
| 5,712,338 | 1/1998 | Donovan et al. | 524/505 |
| 5,713,993 | 2/1998 | Grezzo Page et al. | 106/31.85 |
| 5,730,790 | 3/1998 | Rehman | 106/31.59 |
| 5,734,403 | * 3/1998 | Suga et al. | 347/101 |
| 5,785,743 | 7/1998 | Adamic et al. | 106/31.27 |
| 5,853,465 | * 12/1998 | Tsang et al. | 106/31.25 |
| 5,889,083 | * 3/1999 | Zhu | 523/161 |
| 5,922,118 | * 7/1999 | Johnson et al. | 106/31.6 |
| 5,948,512 | * 9/1999 | Kubota et al. | 428/195 |
| 5,958,121 | * 9/1999 | Lin | 106/31.43 |
| 5,965,634 | * 10/1999 | Idogawa et al. | 523/161 |
| 5,998,501 | * 12/1999 | Tsutsumi et al. | 523/160 |

FOREIGN PATENT DOCUMENTS

0838507A1   4/1998   (EP).

OTHER PUBLICATIONS

Dean, John A. "Lange's Handbook of Chemistry "0 15th Ed., McGraw–Hill New York (pp. 8.33, 8.50, 8.56 8.63–8.65), 1999.*

Morrison, Robert Thornton and Boyd, Robert Neilson; "Organic Chemistry" 5ed., Allyn and Bacon Boston (p. 839), 1987.*

"Lovocryl 47, Speciality Polymer For Low VOC Hair Sprays." Personal Care Polymers, National Starch and Chemical Company, 6 pp. (1994).

"Resin 28–2930, Excellent Holding Power For Hair Sprays." Personal Care Polymers, National Starch and Chemical Company. 10 pp. (1994).

"Amphomer LV–71 (28–4971) For Hard Holding Hair Fixative Formulations." Personal Care Polymers, National Starch and Chemical Company. 6 pp. (1996).

"Amphomer 28–4910 For Hard Holding Hair Fixative Formulations." Personal Care Polymers. National Starch and Chemical Company. 6 pp. (1994).

* cited by examiner

Primary Examiner—Vasu Jagannathan
Assistant Examiner—Callie E. Shosho
(74) Attorney, Agent, or Firm—Michael D. Jones

(57) ABSTRACT

The ink set of this invention comprises at least two inks, one of which contains a pH sensitive polymer and preferably a self-dispersing pigment colorant. A second ink is provided which comprises incompatible inorganic or organic salts or has an appropriate pH. The polymer precipitates onto a medium upon contact with the second ink, thereby providing improved bleed and halo control.

27 Claims, No Drawings

INK TO INK BLEED AND HALO CONTROL USING SPECIFIC POLYMERS IN INK-JET PRINTING INKS

TECHNICAL FIELD

The present invention relates to ink-jet inks employed in ink-jet printing. In particular, this invention relates to an ink system that utilizes the addition of specific polymers to the pigment-based ink. These polymers reduce, and in some cases even eliminate, color bleed and halo problems typically associated with ink-jet printing.

BACKGROUND ART

Ink-jet printers offer a low cost, high quality, and comparatively noise-free option to other types of printers commonly used with computers. Such printers employ a resistor element in a chamber provided with an egress for ink to enter from a plenum. The plenum is connected to a reservoir for storing the ink. A plurality of such resistor elements are arranged in a particular pattern, called a primitive, in a printhead. Each resistor element is associated with a nozzle in a nozzle plate, through which ink is expelled toward a print medium. The entire assembly of printhead and reservoir comprise an ink-jet pen.

In operation, each resistor element is connected via a conductive trace to a microprocessor, where current-carrying signals cause one or more selected elements to heat up. The heating creates a bubble of ink in the chamber, which expels ink through the nozzle toward the print medium. In this way, firing of a plurality of such resistor elements in a particular order in a given primitive forms alphanumeric characters, performs area-fill, and provides other print capabilities on the medium.

Many ink-jet inks, when printed in various colors on bond paper, copier paper, and other media, can lead to bleed and halo. Bleed and halo occur as colors mix both on the surface of the paper being printed on and in the paper. The terms "bleed" and "halo", as used herein, are defined as follows: When inks of two different colors are printed next to each other, it is desired that the border between the two colors be clean and free from the invasion of one color into the other. When one color does invade into the other, the border between the two colors becomes ragged, and this is called bleed. This is in contradistinction to uses of the term "bleed" in the prior art, which often defines "bleed" in the context of ink of a single color following the fibers of the paper. When dye-based inks are printed adjacent to pigment-based inks, the dye-based ink may invade the pigmented ink causing a whitish edge to form in the pigmented ink. This is known as halo, and is most often observed when dye-based color inks are printed adjacent to pigment-based black inks.

Prior solutions to bleed have largely involved the use of heated platens or other heat sources and/or special paper. Heated platens add cost to the printer. Special paper limits the user to a single paper, which is of a higher cost than a plain paper. Another way to reduce bleed involves increasing the penetration rate of the ink into the paper. However, increasing the penetration rate reduces the edge acuity (lowers the print quality of the ink). Nevertheless, this method is acceptable for printing color ink because of the lesser importance of color text quality. However, print quality is important for black ink. And hence, alternate bleed control mechanisms are needed.

U.S. Pat. No. 5,428,383 teaches a method to control bleed in multicolor ink-jet printing involving the use of multivalent metal salts as precipitation agents in a first ink composition. The precipitation agent is designed to react with the coloring agent in a second ink composition.

A solution to the specific problem of black to yellow color bleed is disclosed in U.S. Pat. No. 5,198,023 wherein multivalent cations such as calcium chloride and magnesium chloride are added at concentrations ranging from about 1 to about 10 wt % to yellow cationic inks to prevent bleed between yellow and black inks. However, it has been determined that the addition of large amounts of multivalent cations to thermal ink-jet ink compositions may induce precipitation of dye salts, requiring further adjustments in the ink composition. U.S. Pat. No. 5,518,534 teaches the use of a first ink having a pigment dispersion and the second ink containing a salt of an organic acid or mineral acid wherein said salt reacts with said first ink to alleviate bleed between the inks. However, in this case, the pigment requires the presence of a dispersing agent, and both inks must have the same ionic character.

A method to control bleed is also disclosed by U.S. Pat. No. 5,730,790. The ink-jet ink is formulated to comprise at least one dye-based ink composition and at least one pigment-based ink. The dye-base ink also contains a cationic surfactant, and the pigment-base ink contains a negatively charged dispersant.

Another method of reducing bleed between ink-jet inks involves the use of pH-sensitive dyes as disclosed in U.S. Pat. No. 5,181,045. It discloses an ink having a pH-sensitive dye to prevent bleeding to an adjacent ink having an appropriate pH. Migration of the ink having the pH-sensitive dye is prevented by rendering the dye insoluble on the page by contact with the pH of the adjacent ink. This method requires a pH differential of about 4 or 5 units to completely control bleed. Accordingly, a pH not exceeding 4 would be required to effectively eliminate bleed from a pH-sensitive ink having a typical pH of about 8.

U.S. Pat. No. 5,679,143 builds upon the '045 case referenced above, but an organic acid component is added to the so-called target ink-jet ink composition, as opposed to the pH-sensitive ink composition. The organic acid component reduces the pH differential required to control bleed to about 3 units or less.

While each of the above has produced varying degrees of success, a need still remains for ink compositions for use in ink-jet printing which do not evidence bleed or halo, as defined herein, when printed on plain papers, and yet which posses relatively long shelf life and other desirable properties of such inks.

DISCLOSURE OF INVENTION

In accordance with the invention, an ink set is provided in which certain pigment-based inks, especially inks comprising self-dispersing pigments, contain polymers which become insoluble under either specific and well defined pH conditions or when contacted with incompatible ionic substances. By forcing the polymers present to become insoluble on the page, migration of the colorant is inhibited, thereby helping to reduce bleed and halo between different colors. Rendering the polymers insoluble is achieved by making the polymer come out of solution or to precipitate; this is done by contacting the polymer with another ink having an appropriate pH or one which contains ions that are incompatible with the polymers, or both.

BEST MODES FOR CARRYING OUT THE INVENTION

While it is known that certain colorant classes, including dyes and dispersed pigments, become insoluble under specific and well defined pH conditions or in the presence of incompatible ions, the use of specific polymers found to precipitate under certain pH conditions and in the presence of certain ions allows the use of a broader class of pigments, particularly self-dispersing pigments, which have not been previously associated with good bleed control. Use of these specific polymers also allows formulation flexibility because these polymers do not contribute to the dispersion or water-solubility of the colorants, so new classes of polymers can be utilized for bleed control without concern of their ability to disperse. For example, traditional water based pigment inks consists of a pigment material that is essentially insoluble. These pigments were rendered effectively soluble through the use of a dispersant, usually having a hydrophobic portion and a hydrophilic portion. By utilizing self-dispersing pigments, the polymers of this invention can be designed to be pH and ion/or sensitive yet have little dispersing ability.

Polymers that have acidic groups, such as carboxylate groups, are pH sensitive. These carboxylated, or otherwise acidified, polymers will either be in solution or precipitate based on their pH-dependant solubility. As the pH is lowered and the carboxylate groups become protonated, the solubility of the polymer decreases. At some point, the polymer will begin to become unstable and will effectively drop out of solution. Typical polymers for use herein include those having at least one and preferably multiple carboxyl groups, which commonly consist of acrylic monomers and polymers known in the art. Hydrophobic moieties are also required to aid in the precipitation of the polymer and induce flocculation of the pigment in an aqueous based ink. When the polymer carries a net anionic charge, the pigment must also carry a net anionic or nonionic charge.

Without subscribing to any particular theory, the Applicants believe that by forcing a polymer contained in an ink to become insoluble on the page, then migration of the colorant in the ink will be inhibited, thereby helping to reduce bleed between the inks. The "force" used to make the polymer come out of solution or to precipitate is to contact the polymer containing ink with another ink having an appropriate pH or containing incompatible ions.

Polymers

The polymers of this invention can be random or block copolymers. The polymers are selected to precipitate with a change of pH or in the presence of certain ions or both. In general, polymers which precipitate with a change from higher to lower pH will comprise monomers containing an acidic group and a hydrophobic group; polymers which precipitate with a change from lower to high pH will comprise monomers containing amine functionality and hydrophobic moieties. The structure for the polymers of this invention is:

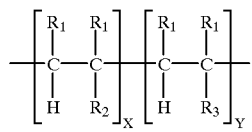

wherein $R_1$ are independently selected from H or a $C_1$–$C_{18}$ substituted or unsubstituted, branched or unbranched, alkyl, aromatic, or cyclic chain and may contain halogen, ester, ether, amine or amide functionalities, and is preferably H, $CH_3$, a halogen or a halogenated methyl group; and $R_2$ is a group containing either a carboxylic acid group having a $pK_a$ of from about 5 to about 7.5, or a primary, secondary, or tertiary amine functionality. $R_3$ is a $C_1$–$C_{18}$ substituted or unsubstituted, branched or unbranched, alkyl, aromatic, or cyclic chain, which may contain ester, ether, amine or amide functionalities. Examples of monomers of type X that contain carboxylic acids that are useful in the invention include, but are not limited to; acrylic acid, methacrylic acid, crontonic acid, 2-trifluoromethylacrylic acid and 2-bromoacrylic acid. Typically, polymers containing acidic $R_2$ monomers will be present in the ink as acid salts of Na, K, Li, triethanolamine, 2-amino-2-methyl-1propanol and the like. Examples of monomers of type X that contain primary, secondary, and tertiary amines that are useful in the invention include, but are not limited to; 2-(diethylamino)ethyl acrylate, 2-(dimethylamino)ethyl acrylate, 3-(dimethylamnino)propyl acrylate, butylaminoethyl methacrylate, 2-aminoethyl methacrylate and N-[3-(dimethylamino)propyl]acrylamide. Typically, polymers containing primary secondary, and/or tertiary amine $R_2$ monomers alone will be present in the ink as salts of Cl, Br, I, sulfate, nitrate, and the like. Hydrophobic monomers of type Y that are useful in the invention include, but are not limited to; methyl and ethyl esters of acrylic and methacrylic acids, ethyl-2-(bromomethyl) acrylate, propyl acrylates and methacrylates, butyl a acrylates and methacrylates, isoamyl acrylate, hexyl acrylates and methacrylates, cyclohexyl acrylates and methacrylates and their alkyl derivatives, ethylhexyl acrylates and methacrylates, trimethylhexyl acrylate, isooctyl acrylate, isodecyl acrylate, dodecyl acrylate, tridecyl methacrylate, octadecyl acrylate, isobornyl acrylate and methacrylate, phenyl methacrylate, benzyl methacrylate, 2-butoxyethyl acrylate and methacrylate, 2-ethoxyethyl acrylate, neopentyl glycol acrylate benzoate, ethylene glycol phenyl ether acrylate, hydroxybutyl acrylate, alkyl esters of crotonic acid, N,N-dimethylacrylamide, N-isopropylacrylamide and methacrylamide, N-octylacrylamide, N-(butoxymethyl) acrylamide, N-(isobutoxymethyl)acrylamide, methyl-2-acrylamido-2-methoxyacetate, vinyl acetate, vinyl neodecanoate, cyclohexyl vinyl ether, 2-ethylhexyl vinyl ether and styrene. Polymers of this invention may contain more than one X-type or Y-type monomer.

The average molecular weight of the polymers of this invention ranges from about 1,000 to about 20,000, preferably from about 1,000 to about 12,000; more preferably from about 3,000 to about 10,000. The above monomers are provided in sufficient amounts to provide a polymer that will be stable when solubilized in water yet will effectively precipitate and flocculate the pigment upon the change in pH or contact with the appropriate ions. Thus, polymers may be selected which comprise other monomers as long as an effective amount of the above monomers comprise part of the polymer chain. Polymers of this invention may contain monomers of more than one X-type, Y-type, or both, in addition to other monomers chosen by the formulator.

In a preferred embodiment, $R_2$ is a carboxylic acid moiety, thus having the structure:

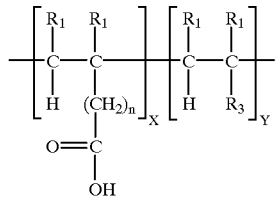

wherein $R_1$ are independently selected from H or a $C_1$–$C_{18}$ substituted or unsubstituted, branched or unbranched, alkyl, aromatic, or cyclic chain and may contain ester, ether, amine or amide functionalities, and is preferably H, $CH_3$, a halogen or a halogenated methyl group; and n is from 0 to 15, preferably 0 to about 3, so as long as the group has $pK_a$ of from about 5 to about 7.5. $R_3$ is a $C_1$–$C_{18}$ substituted or unsubstituted, branched or unbranched, alkyl, aromatic, or cyclic chain, which may contain ester, ether, amine or amide functionalities.

The acidity, measured by the acid number, of these polymers are in the range of 55–400 mg KOH/g of polymer; preferably from 80–350 mg KOH/g of polymer; more preferably from 80–200 mg KOH/g of polymer. When the polymers have X-type monomers without acidic groups and the $R_2$ groups contain primary, secondary, and/or tertiary amine functionality, the amount of basic nitrogen in the polymer, measured as the meq of basic nitrogen per gram, ranges from between about 1 to about 7 meq/g, preferably about 1.5 to about 6.2 meq/g and even more preferably between about 1.5 to about 3.5 meq/g.

The following examples of polymers that are useful in this invention are not intended to limit the scope of the invention. Monomer ratios are given in weight percent. Molecular weights conform to the ranges given above. Examples; a) 8:92 acrylic acid:butyl acrylate, acid number 62 mg KOH/g; b) 10:90 methacrylic acid:butyl acrylate, acid number 65 mg KOH/g; c) 12:88 acrylic acid:ethyl acrylate, acid number 93 mg KOH/g; d) 14:86 methacrylic acid:ethyl acrylate, acid number 91 mg KOH/g; e) 16:60:24 acrylic acid:methyl methacrylate:hexyl acrylate, acid number 125 mg KOH/g; f) 16:5:15:64 acrylic acid:butylaminoethyl methacrylate:octylacrylamide:methylmethacrylate, acid number 125 mg KOH/g; g) 19:40:41 methacrylic acid:ethyl acrylate:methyl methacrylate, acid number 124 mg KOH/g; h) 30:30:30 methacrylic acid:methyl methacrylate:benzyl methacrylate, acid number 195 mg KOH/g; and i) 44:56 acrylic acid:ethyl acrylate, acid number 325 mg KOH/g. Other combinations could also be made. Some modifications could be made by those skilled in the art and still be within the spirit of the invention.

The use of pH sensitive polymers should not be confused with the use of pH changes on paper, which lead to improved waterfastness. First, waterfastness issues involve the ability of the ink to resist smearing when water is dripped across a printed line of ink, while bleed resistance is the ability of the ink to resist mixing of one color with another when both are printed in close succession. Having solved one problem does not imply a solution to the other.

Solving waterfastness in other systems has involved the use of a single ink. This is in contrast to the present invention in which a second ink is used to bring about the desired effect, i.e., reduction of bleed and halo.

In addition, the present invention involves what is essentially a border effect, i.e., the drastic pH conditions of the two inks in question or the presence of incompatible ions in one of the inks bring about the desired effect at the border of the two inks. This differs with the mode in which other dye-based inks achieve waterfastness, i.e., an entire dot of black ink is subjected to paper which lowers the pH slightly and brings about insolubility (and thus waterfastness); see, e.g., U.S. Pat. No. 4,963,189.

Finally, it should be mentioned that using a second ink with a pH of, for example, 4 will have a much greater effect on the solubility of the pH-sensitive polymer than will any pH change caused by the paper. Paper-induced pH changes in the ink are small compared to contact with a fluid that is buffered at a pH of 4. Thus, while it is thought that the pH of the paper itself contributes to an improvement of waterfastness, in the present application, a second ink, having a pH low enough to bring about insolubility of polymers in the first ink or the presence of specific polymer-incompatible ions, is used to bring about the desired effect, i.e., bleed and halo reduction.

The method of the invention eliminates the requirement of a heater or heated platen in order to reduce bleed and halo from an ink of one color into an ink of another color, and the need for special paper to control bleed and halo between inks that otherwise would bleed or show signs of halo on plain types of paper.

While the specific example given is directed to the use of an ink having a lower pH than the first ink, it is also possible to employ an ink having a higher pH than the initial ink. In this case, the pH-sensitive ink would have the property that it precipitates as the pH is increased. For example, if the polymer is soluble at a low pH by carrying a positive charge through protonation of an amine group on the polymer, it is possible to precipitate the polymer by contacting it with a second ink that is buffered at a high pH causing deprotonation of the polymer. This system would work in conjunction with pigments that are either dispersed by nonionic or with a cationic charged moieties or with self-dispersing pigments that have been modified to carry a net positive charge.

The effect on bleed may be seen at a pH difference of about 1 to 3 units. Further and near complete control of bleed results when the pH difference is further increased, to about 4 to 5 units. However, these values do not preclude the use of a polymer which is more sensitive to pH than those disclosed herein; with more sensitive pH-polymers, near complete control of bleed could result with only a small difference in pH, considerably less than 4 units.

Muli-valents Salts

In one embodiment herein, the polymers of this invention interact with incompatible multi-valent (inorganic or organic) salts in the second ink. These salts must be soluble in the ink in the concentration employed. Suitably-employed cations for the multi-valent salt include alkaline earth metals of group 2A of the periodic table (e.g., magnesium and calcium); the transition metals of group 3B of the periodic table (e.g., lanthanum); cations from group 3A of the periodic table (e.g., aluminum); and lanthanides (e.g., neodymium). Preferably, calcium and magnesium are employed as cations in the practice of this invention. Suitably employed anions associated with calcium or magnesium include nitrate, chloride, acetate, benzoate, formate, and thiocyanate. Salts preferably employed in this invention are nitrate, chloride, and acetate salts of calcium and magnesium. If used, the salt should be present in the second ink in an amount ranging from about 1% to about 10%, preferably from about 1.5% to about 7%, more preferably from about 2% to about 6% by weight of the ink.

Organic Acid

Examples of organic acids which may be included in the second ink to aid in the pH and buffering capabilities of the second ink include, but are not limited to, mono-, di-, and polyfunctional organic acids. In general, it is contemplated that any soluble organic acid having a $pK_a$ equal to or less than that of the pH-sensitive polymer of concern may be suitably employed. Preferably, one of the following classes of organic acids is employed: polyacrylic, acetic, glycolic, malonic, malic, maleic, ascorbic, succinic, glutaric, fumaric, citric, tartaric, lactic, sulfonic, and ortho-phosphoric acid, derivatives thereof, and mixtures thereof. If used, the organic acid should be present in the second ink in an amount ranging from about 1% to about 10%, preferably from about 2% to about 7%, more preferably from about 3% to about 6% by weight of the ink.

Self-dispersing Pigmnent

In one approach, the pigment employed in the ink is a self-dispersing pigment. Such pigments suitable for use herein include all chemically modified water-dispersible, pigments known for use in ink-jet printing. These chemical modifications impart water-dispersiblity to the pigment precursors that encompass all organic pigments.

For self-dispersibility or water solubility, the pigments herein are modified by the addition of one or more organic groups comprising at least one aromatic group or a C1–C12 alkyl group and at least one ionic group or ionizable group. The ionizable group is one that forms its ionic groups in the aqueous medium. The ionic group may be anionic or cationic. The aromatic groups may be further substituted or unsubstituted. Examples include phenyl or napthyl groups and the ionic group is sulfonic acid, sulfrnic acid, phosphonic acid, carboxylic acid, ammonium, quaternary ammonium, or phosphonium group.

Depending on the process selected, the pigment can either be anionic or cationic in character. As commercially available, the anionic chromophores are usually associated with sodium or potassium cations, and the cation chromophores are usually associated with chloride or sulfate anions.

For modification, one preferred method is treatment of the carbon black pigment with aryl diazonium salts containing at least one acidic functional group. Examples of aryl diazonium salts include those prepared from sulfanilic acid, 4-aminobenzoic acid, 4-aminosalicylic acid, 7-amino-4hydroxy-2-naphthlenesulfonic acid, aminophenylboronic acid, aminophenylphosphonic acid and metanilic acid.

Ammonium, quaternary ammonium groups, quaternary phosphonium groups, and protonated amine groups represent examples of cationic groups that can be attached to the same organic groups discussed above.

See U.S. Pat. Nos. 5,707,432; 5,630,868; 5,571,311; and 5,554,739 for a discussion of modified carbon black pigments and methods of attaching the functionalized groups.

The following pigments are useful in the practice of this invention; however, this listing is not intended to limit the invention. The following pigments are available from Cabot: Monarch® 1400, Monarch® 1300, Monarch® 1100, Monarch® 1000, Monarch® 900, Monarch® 880, Monarch® 800, and Monarch® 700, Cab-O-Jet® 200 and Cab-O-Jet® 300. The following pigments are available from Columbian: Raven 7000, Raven 5750, Raven 5250, Raven 5000, and Raven 3500. The following pigments are available from Degussa: Color Black FW 200, Color Black FW 2, Color Black FW 2V, Color Black FW 1, Color Black FW 18, Color Black S160, Color Black FW S170, Special Black 6, Special Black 5, Special Black 4A, Special Black 4, Printex U, Printex 140U, Printex V, and Printex 140V. Tipure® R-101 is available from DuPont.

All concentrations herein are in weight percent, unless otherwise indicated. The purity of all components is that employed in normal commercial practice for ink-jet inks. All references are hereby incorporated by reference.

Ink-jet Ink Vehicle—The ink compositions of this invention comprise the colorants, a bleed and halo controlling polymer(s), and the ink vehicle. For a discussion of inks and their properties, see The Printing Manual, 5th ed. Leach et al. (Chapman and Hall, 1993). See also U,S, Pat. Nos. 2,833,736; 3,607,813; 4,104,061; 4,770,706; and 5,026,755.

A typical formulation for an ink useful in the practice of the invention includes the colorant (about 0.001% to 10 wt %), one or more cosolvents (0.01 to about 50 wt %), one or more water-soluble surfactants/amphiphiles (0 to about 40, preferably about 0.1 to about 5 wt %), one or more high molecular weight colloids (0 to about 3 wt %), and water (balance). Of course, one or more of the inks in the ink-set will contain the bleed and halo controlling polymer(s), present in a amount of from about 0.1 to about 10% by wt of the ink composition, preferably from 0.1 to about 3%.

One or more cosolvents may be added to the vehicle in the formulation of the ink. Classes of cosolvents employed in the practice of this invention include, but are not limited to, aliphatic alcohols, aromatic alcohols, diols, glycol ethers, poly(glycol) ethers, caprolactams, lactones, formamides, acetamides, and long chain alcohols. Examples of compounds employed in the practice of this invention include, but are not limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-alcohols of 30 carbons or less, 1,3-alcohols of 30 carbons or less, 1,5-alcohols of 30 carbons or less, ethylene glycol alkyl ethers, propylene glycol alkyl ethers, poly(ethylene glycol) alkyl ethers, higher homologes of poly(ethylene glycol) alkyl ethers, poly(propylene glycol) alkyl ethers, higher homologues of poly(propylene glycol) alkyl ethers, N-alkyl caprolactams, unsubstituted caprolactams, substituted formamides, unsubstituted formamides, substituted acetamides, and unsubstituted acetamides. Specific examples of cosolvents that are preferably employed in the practice of this invention include, but are not limited to, 1,5-pentanediol, 2-pyrrolidone, 2-ethyl-2-hydroxymethyl-1, 3-propanediol, diethylene glycol, 3-methoxybutanol, and 1,3-dimethyl-2-imidazolidinone. The cosolvent concentration may range from about 0.01 to about 50 wt %, with about 0.1 to 20 wt % being preferred.

Water-soluble surfactants may be employed in the formulation of the vehicle of the ink. These surfactants are added as free components to the ink formulation and are not otherwise associated or intended to become part of the polymers described herein. For convenience, examples of surfactants are divided into two categories: (1) non-ionic and amphoteric and (2) ionic. The former class includes: TERGITOLs, which are alkyl polyethylene oxides available from Union Carbide; TRITONs, which are alkyl phenyl polyethylene oxide surfactants available from Rohm & Haas Co.; BRIJs; PLURONICs (polyethylene oxide block copolymers); and SURFYNOLs (acetylenic polyethylene oxides available from Air Products); POE (polyethylene oxide) esters; POE diesters; POE amines; POE amides; and dimethicone copolyols. Amphoteric surfactants such as substituted amine oxides are useful in the practice of this invention. Cationic surfactants such as protonated POE amines may also be used. U.S. Pat. No. 5,106,416, discloses more fully most of the surfactants listed above. The nonionic amphiphiles/surfactants are more preferred than the ionic surfactants. Specific examples of amphiphiles/surfactants that are preferably employed in the practice of this invention include iso-hexadecyl ethylene oxide 20, SURFYNOL CT-111, TERGITOL 15-S-7, and amine oxides, such as N,N-dimethyl-N-dodecyl amine oxide, N,N-dimethyl-N-tetradecyl amine oxide, N,N-dimethyl-N-hexadecyl amine oxide, N,N-dimethyl-N-octadecyl amine oxide, N,N-dimethyl-N-(Z-9-octadecenyl)-N-amine oxide. The concentration of the amphiphile/surfactants may range from 0 to 40 wt %, preferably from about 0.1% to 3 wt %.

To furher improve optical density, between 0 and about 3 wt % of a high molecular weight colloid derived from natural or synthetic sources may optionally be added to the ink formulation. Addition of a high molecular weight colloid improves print quality. Example of high molecular weight colloids employed in the practice of this invention include alginates, mannuronic acid, carageenan, guar gum, xanthan gum, dextran, chitin, chitosan, carboxymethylcellulose, nitromethylcellulose, and all derivatives thereof. These colloids are disclosed in U.S. Pat. No. 5,133,803, "High Molecular Weight Colloids for Bleed Control." The preferred concentration of the high molecular weight component colloid in the inks of this invention is from about 0.1% to about 0.75 wt %.

Consistent with the requirements for this invention, various types of additives may be employed in the ink to optimize the properties of the ink composition for specific applications. For example, as is well-known to those skilled in the art, biocides may be used in the ink composition to inhibit growth of microorganisms. Preferred examples of biocides include Urarcide™ and Proxel™, and NuoCept™. Sequestering agents such as EDTA may be included to eliminate deleterious effects of heavy metal impurities, and buffer solutions may be used to control the pH of the ink. Other known additives such as viscosity modifiers and other acrylic or non-acrylic polymers may be added to improve various properties of the ink compositions as desired.

The inks are formulated by combining the various components of the vehicle and mixing them with the colorants and polymers disclosed herein. The viscosity of the final ink composition is from about 0.8 to about 8 cPs, preferably from about 0.9 to about 4 cPs.

A method of ink-jet printing is also disclosed herein. The inks of this invention may be used in any conventional ink-jet or bubble-jet or piezoelectric printer. Preferably the inks are used in thermal ink-jet printers. The ink is typically charged into a printer cartridge and printed on any medium. Examples of suitable media for printing includes paper, textiles, wood, and plastic.

EXAMPLES

Example 1

Three black inks are prepared. Each have the following common ingredients; 7% 2-pyrrolidone, 0.4% neopentyl alcohol, 5.5% Liponics EG-1, 2% Liponics EG-7, 0.1% dodecanol, 0.15% Surfynol 465, 0.3% Proxel GXL, 3% Cab-O-Jet® 300 (an anionic self-dispersing carbon black with carboxylate surface functionality—Cabot Corp.), and the balance of the formulae is water. The three inks A, B and C are distinguished by having the addition of 0, 0.5 and 1.0% Neocryl® BT-520 (an acrylate copolymer having an acid number 65 mg KOH/g of polymer and available from Zeneca—here used as the bleed control additive) respectively. The pH of each black ink is adjusted to 8.5 by addition of potassium hydroxide. The inks are filled into black inkjet pens designed for the Hewlett-Packard Deskjet® 850C ink-jet printer.

A yellow ink is prepared with 7.5% 2-pyrrolidone, 8% 1,5-pentanediol, 7.5% ethylhydroxypropanediol (EHPD), 5% citric acid, 1.75% Tergitol 15-S-7, 4% β-alanine, Na-Direct Yellow 132 dye (Abs=0.12 at 1:10,000 dilution), the balance water. This results in an ink that is buffered at pH 4. The yellow ink is filled into the yellow chamber of a color ink-jet pen designed for the Hewlett-Packard Deskjet® 850C inkjet printer.

A Hewlett-Packard Deskjet® 850C inkjet printer is used to print a black line approximately 0.1 inch wide and flanked by two adjacent yellow boxes printed with the above yellow ink on Union Camp Jamestown® paper. The black-color bleed is evaluated using a visual rating system of very poor VP, poor P, moderate M, good G, very good VG and excellent E. The results are shown in Table II.

TABLE II

| Black-Yellow (KY) Bleed | |
| --- | --- |
| Ink | Bleed |
| A | VP |
| B | P |
| C | M |

Thus, the bleed is substantially reduced by addition of this polymeric additive in the black ink when printed adjacent to a color ink buffered to a low pH. In addition, when black and yellow blocks are printed adjacent to one another, the degree of halo is significantly reduced when the polymeric additive is present in the black.

Example 2

Black ink D is prepared containing 7% 2-pyrrolidone, 0.4% neopentyl alcohol, 5.5% Liponics EG-1, 2% Liponics EG-7, 0.1% dodecanol, 0.15% Surfynol 465, 0.3% Proxel GXL, 3% Cab-O-Jet® 300 (an anionic self-dispersing carbon black with carboxylate surface functionality—Cabot Corp.), 1% Elvacite® 2669 (a copolymer of methyl methacrylate/ethyl acrylate/methacrylic acid and having an acid number of 124 mg KOH/g of polymer, available from ICI Acrylics—here used as the bleed control additive) and the balance of the formula is water. The pH of the black ink is adjusted to 8.5 by addition of potassium hydroxide. The ink is filled into a black ink-jet pen designed for the Hewlett-Packard Professional® 2000C ink-jet printer.

The color inks, cyan, magenta and yellow, are prepared using a common vehicle consisting 7.5% 2-pyrrolidone, 8% 1,5-pentanediol, 7.5% EHPD, 5% citric acid, 1.75% Tergitol 15-S-7, 4% β-alanine, dyes and the balance water. About 2% TMA-Direct Blue 199, Li-Acid Red 52 and Na-Direct Yellow 132 dyes are used as the colorants. The color inks are filled into the color ink-jet pens designed for the Hewlett-Packard Professional® 2000C inkjet printer.

A Hewlett-Packard Professional® 2000C inkjet printer is used to print black lines of inks D and ink A (from Example 1) approximately 0.1 inch wide and flanked by adjacent cyan, magenta and yellow boxes printed with the above color ink set on Union Camp Jamestown® paper. The black-color bleed is evaluated using a visual rating system of very poor VP, poor P, moderate M, good G, very good VG and excellent E. The results are shown in Table III.

TABLE III

| Black-Color Bleed | | | | | | |
| --- | --- | --- | --- | --- | --- | --- |
| (C = cyan M = magenta, Y = yellow R = red, G = green, B = blue and K = black) | | | | | | |
| Inks | KC | KM | KY | KR | KG | KB |
| A | VP | VP | VP | VP | P | P |
| D | E | E | E | E | E | E |

Thus, the bleed is substantially reduced by addition of this polymeric additive in the black ink when printed adjacent to a color ink buffered to a low pH. Additionally, when black blocks are printed adjacent to blocks of the primary and secondary colors, the halo is either significantly reduced or nonexistent when the polymeric additive is present in the black.

Example 3

Black ink E is prepared containing 7% 2-pyrrolidone, 0.4% neopentyl alcohol, 5.5% Liponics EG-1, 2% Liponics EG-7, 0.1% dodecanol, 0.15% Surfynol 465, 0.3% Proxel GXL, 3% Cab-O-Jet® 300 (an anionic self-dispersing carbon black with carboxylate surface functionality—Cabot Corp.) as the colorant and the balance of the formula is water. In this example the bleed control agent consists of the addition of 1% copolymer containing 1:1 mole ratios of ethylacrylate:acrylic acid (available from PolySciences) and having an acid number of about 325 mg KOH/g of polymer. The pH of the black ink is adjusted to 8.5 by addition of potassium hydroxide. The ink is filled into a black ink-jet pen designed for the Hewlett-Packard Professional® 2000C ink-jet printer. The same cyan, magenta and yellow color inks prepared in Example II are filled into the color ink-jet pens designed for the Hewlett-Packard Professional® 2000C inkjet printer.

A Hewlett-Packard Professional® 2000C inkjet printer is used to print black lines of inks E and ink A (from Example 1) approximately 0.1 inch wide and flanked by adjacent cyan, magenta and yellow boxes printed with the above color ink set on Union Camp Jamestown® paper. The black-color bleed is evaluated using a visual rating system of very poor VP, poor P, moderate M, good G, very good VG and excellent E. The results are shown in Table IV.

TABLE IV

Black-Color Bleed (C = cyan, M = magenta, Y = yellow R = red, G = green, B = blue and K = black)

| Inks | KC | KM | KY | KR | KG | KB |
|------|----|----|----|----|----|----|
| A    | VP | VP | VP | VP | P  | P  |
| B    | G  | G  | P  | M  | G  | VG |

Thus, the bleed is substantially reduced by addition of this polymeric additive in the black ink when printed adjacent to a color ink buffered to a low pH. Additionally, when black blocks are printed adjacent to blocks of the primary and secondary colors, the halo is significantly reduced when the polymeric additive is present in the black.

Example 4

Black ink F is prepared containing 7% 2-pyrrolidone, 0.4% neopentyl alcohol, 5.5% Liponics EG-1, 2% Liponics EG-7, 0.1% dodecanol, 0.15% Surfynol 465, 0.3% Proxel GXL, 3% Cab-O-Jet® 300 (an anionic self-dispersing carbon black with carboxylate surface functionality—Cabot Corp.), 1% Resyn® 28-2930 (a copolymer of vinyl acetate, crotonates, and vinyl neodecanoate having an acid number of 65 mg KOH/g of polymer and available from National Starch—here used as the bleed control additive) and the balance of the formula is water. The pH of the black ink is adjusted to 8.5 by addition of potassium hydroxide. The ink is filled into a black ink-jet pen designed for the Hewlett-Packard Professional® 2000C ink-jet printer. The same cyan, magenta and yellow color inks prepared in Example II are filled into the color ink-jet pens designed for the Hewlett-Packard Professional® 2000C inkjet printer.

A Hewlett-Packard Professional® 2000C inkjet printer is used to print black lines of inks F and ink A (from Example 1) approximately 0.1 inch wide and flanked by adjacent cyan, magenta and yellow boxes printed with the above color ink set on Union Camp Jamestown® paper. The black-color bleed is evaluated using a visual rating system of very poor VP, poor P, moderate M, good G, very good VG and excellent E. The results are shown in Table V.

TABLE V

Black-Color Bleed (C =cyan, M = magenta, Y = yellow R = red, G = green, B = blue and K = black)

| Inks | KC | KM | KY | KR | KG | KB |
|------|----|----|----|----|----|----|
| A    | VP | VP | VP | VP | P  | P  |
| F    | VG | VG | G  | G  | E  | E  |

Thus, the bleed is substantially reduced by addition of this polymeric additive in the black ink when printed adjacent to a color ink buffered to a low pH. Additionally, when black blocks are printed adjacent to blocks of the primary and secondary colors, the halo is either significantly reduced or nonexistent when the polymeric additive is present in the black.

Example 5

Black inks G and H are prepared using 7% 2-pyrrolidone, 0.4% neopentyl alcohol, 5.5% Liponics EG-1, 2% Liponics EG-7, 0.1% dodecanol, 0.15% Surfynol 465, 0.3% Proxel GXL and 3% Cab-O-Jet® 300 (an anionic self-dispersing carbon black with carboxylate surface functionality—Cabot Corp.). Ink G contained 1% Balance® 47 and Ink H contains 1% Amphomer® LV-71 (both being copolymers of octylacrylamide, butylaminoethyl methacrylate, and other acrylate monomers (at least one of which is an acidic monomer), having acid numbers of 140 and 137 mg KOH/g of polymer respectively; both available from National Starch and here used as bleed control additives) with water as the balance of the formulae. The pH of the black ink is adjusted to 8.5 by addition of potassium hydroxide. The inks are filled into black ink-jet pens designed for the Hewlett-Packard Professional® 2000C ink-jet printer. The same cyan, magenta and yellow color inks prepared in Example II are filled into the color inkjet pens designed for the Hewlett-Packard Professional® 2000C inkjet printer.

A Hewlett-Packard Professional® 2000C inkjet printer is used to print black lines of inks G and H and ink A (from Example 1) approximately 0.1 inch wide and flanked by adjacent cyan, magenta and yellow boxes printed with the above color ink set on Union Camp Jamestown® paper. The black-color bleed is evaluated using a visual rating system of very poor VP, poor P, moderate M, good G, very good VG and excellent E. The results are shown in Table VI.

TABLE VI

Black-Color Bleed (C = cyan, M = magenta, Y = yellow R = red, G = green, B = blue and K = black)

| Inks | KC | KM | KY | KR | KG | KB |
|------|----|----|----|----|----|----|
| A    | VP | VP | VP | VP | P  | P  |
| G    | VG | VG | VG | VG | E  | E  |
| H    | VG | VG | VG | VG | E  | E  |

Thus, the bleed is substantially reduced by addition of these polymeric additives in the black ink when printed adjacent to a color ink buffered to a low pH. Additionally, when black blocks are printed adjacent to blocks of the primary and secondary colors, the halo is significantly reduced when the polymeric additives are present in the black.

Example 6

Black inks A, (Example 1), D (Example 2), G (Example 5) and H (Example 5) are utilized in this example when incompatible Ca and Mg cations in the color inks work in conjunction with the polymeric bleed control agents in the black inks for bleed control purposes. The inks are filled into black ink-jet pens designed for the Hewlett-Packard Deskjet® 850C ink-jet printer.

The cyan, magenta and yellow color inks from Table VII are filled into the three chambers of a color ink-jet pen designed for the Hewlett-Packard Deskjet® 850C inkjet printer.

TABLE VII

Examples of Color Inks Containing Incompatible Ions
(Components in Weight Percent)

|  | Cyan | Magenta | Yellow |
|---|---|---|---|
| 1,5-Pentanediol | 8.0 | 8.0 | — |
| Diethylene glycol | — | — | 4.0 |
| 2-Pyrrolidone | 7.5 | 7.5 | 8.0 |
| Tergitol 15-S-5 | 7.5 | 7.5 | 4.0 |
| Tergitol 15-S-7 | 2.0 | 2.0 | 1.0 |
| Calfax 16L-35 | 0.37 | 0.37 | 0.37 |
| Calcium nitrate tetrahydrate | — | — | 7.0 |
| Magnesium nitrate hexahydrate | 6.0 | 6.0 | — |
| Proxel GXL | 0.2 | 0.2 | 0.2 |
| 4-Morpholine ethane sulfonic acid | — | 0.2 | 0.2 |
| Trizma base | 0.2 | — | — |
| Na Acid Blue 9 (Abs at 1:10,000 dilution | 0.158 | — | — |
| TMA-Direct Blue 199 (Abs at 1:10,000 dilution) | 0.090 | — | — |
| Reactive Red 180 (Abs at 1:10,000 dilution) | — | 0.90 | — |
| Li-Acid Red 52 (Abs at 1:10,000 dilution) | — | 0.135 | — |
| TMA-Acid Yellow 23 (Abs at 1:10,000 dilution) | — | — | 0.128 |
| PH | 8.0 | 7.0 | 6.5 |

A Hewlett-Packard Deskjet® 850C inkjet printer is used to print black lines of inks A, D, G and H approximately 0.1 inch wide and flanked by adjacent cyan, magenta and yellow boxes printed with the above color ink set on Union Camp Jamestown® paper. The black-color bleed is evaluated using a visual rating system of very poor VP, poor P, moderate M, good G, very good VG and excellent E. The results are shown in Table VIII.

TABLE VIII

Black-Color Bleed (C = cyan, M = magenta, Y = yellow R = red, G = green, B = blue and K = black)

| Inks | KC | KM | KY | KR | KG | KB |
|---|---|---|---|---|---|---|
| A | VP | VP | VP | P | P | M |
| D | G | M | M | E | E | E |
| G | G | G | G | VG | VG | VG |
| H | G | VG | VG | E | E | E |

Thus, the bleed is substantially reduced by addition of these polymeric additives in the black ink when printed adjacent to a color ink containing cations that cause precipitation of the polymeric bleed control additive. Additionally, when black blocks are printed adjacent to blocks of the primary and secondary colors, the halo is significantly reduced when the polymeric additives are present in the black.

INDUSTRIAL APPLICABILITY

The method of reducing bleed and controlling halo is expected to find use in ink-jet printing applications involving two or more inks.

Thus, there has been disclosed a method of reducing bleed and controlling halo in printing at least two different inks on a print medium from an ink-jet pen. It will be readily apparent to those skilled in this art that various changes and modifications may be made without departing from the spirit of the invention, and all such changes and modifications are considered to fall within the scope of the invention as defined by the appended claims.

What is claimed is:

1. An ink-jet ink set for inkjet printing comprising a first ink and a second ink, wherein said first ink comprises at least one pH-sensitive polymer and a self-dispersing pigment and wherein said second ink comprises a multi-valent salt or has an appropriate pH, such that when said first ink and said second ink contact on a print medium, said polymer in said first ink will precipitate onto said print medium; and wherein said polymer comprises monomers having the structure:

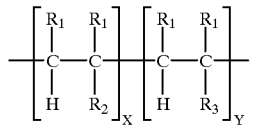

wherein $R_1$ are independently selected from H or a $C_1$–$C_{18}$ substituted or unsubstituted, branched or unbranched, alkyl, aromatic, or cyclic chain, optionally containing halogen, ester, ether, amine or amide functionalities; $R_2$ is a group selected from the group consisting of a moiety containing a carboxylic acid group, primary amine, secondary amine, tertiary amine, or mixtures thereof; and $R_3$ is a $C_1$–$C_{18}$ substituted or unsubstituted, branched or unbranched, alkyl, aromatic, or cyclic chain, optionally containing ester, ether, amine or amide functionalities, said monomer present in an amount sufficient to provide a stable polymer when solubilized in water, yet will precipitate upon contact with said second ink, and providing that at least one monomer must be N-octylacrylamide, at least one monomer is a basic amine group, and one monomer is an acid group, wherein said polymer an acid number within a range of a 80–200 mgKOH/g of polymer.

2. An ink-jet ink set for ink-jet printing according to claim 1 wherein said $R_1$ are independently selected from the group consisting of H, $CH_3$, halogen, halogenated methyl group, or mixtures thereof.

3. An ink-jet ink set for ink-jet printing according to claim 1 wherein said polymer comprises monomers with carboxylic acid functionalities selected from the group consisting of acrylic acid, methacrylic acid, crontonic acid, 2-trifluoromethylacrylic acid, 2-bromoacrylic acid, and mixtures thereof.

4. An ink-jet ink set for ink-jet printing according to claim 1 wherein said polymer comprises amine functionalities and are selected from the group consisting of 2-(diethylamino) ethyl acrylate, 2-(dimethylamino)ethyl acrylate, 3-(dimethylamino)propyl acrylate, butylaminoethyl methacrylate, 2-aminoethyl methacrylate, N-acrylamide, and mixtures thereof.

5. An ink-jet ink set for ink-jet printing according to claim 4 wherein the amount of basic nitrogen in said polymers, measured as the meq of basic nitrogen per gram, is from about 1 to about 7 meq/g.

6. An ink-jet ink set for ink-jet printing according to claim 1 wherein said polymer comprises hydrophobic monomers selected from the group consisting of methyl esters and ethyl esters of acrylic, methacrylic acids, ethyl-2-(bromomethyl) acrylate, propyl acrylates, propyl methacrylates, butyl acrylates, butyl methacrylates, isoamyl acrylate, hexyl acrylates, hexyl methacrylates, cyclohexyl acrylates, cyclohexyl methacrylates, alkyl derivatives of cyclohexyl acrylates and methacrylates, ethylhexyl acrylates, ethylhexyl methacrylates, trimethylhexyl acrylate, isooctyl acrylate, isodecyl acrylate, dodecyl acrylate, tridecyl methacrylate, octadecyl acrylate, isobornyl acrylate, isobornyl methacrylate, phenyl methacrylate, benzyl methacrylate, 2-butoxyethyl acrylate, 2-butoxyethyl methacrylate, 2-ethoxyethyl acrylate, neopentyl glycol acrylate benzoate, ethylene glycol phenyl ether acrylate, hydroxybutyl acrylate, alkyl esters of crotonic acid, N,N-dimethylacrylamide, N-isopropylacrylamide and methacrylamide, N-(butoxymethyl)acrylamide, N-(isobutoxymethyl)acrylamide, methyl-2-acrylamido-2-methoxyacetate, vinyl acetate, vinyl neodecanoate, cyclohexyl vinyl ether, 2-ethylhexyl vinyl ether, styrene, and mixtures thereof.

7. An ink-jet ink set for ink-jet printing according to claim 1 wherein said polymer comprises monomers having the following basic structure:

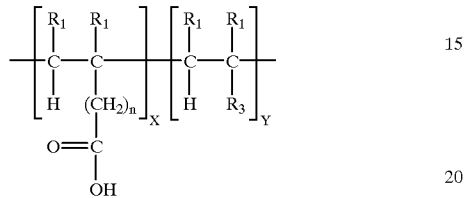

wherein $R_1$ are independently selected from H or a $C_1$–$C_{18}$ substituted or unsubstituted, branched or unbranched, alkyl, aromatic, or cyclic chain, optionally containing ester, ether, amine or amide functionalities; n is from 0 to about 15, so as long as the group has a $pK_a$ of from about 5 to about 7.5; and $R_3$ is a $C_1$–$C_{18}$ substituted or unsubstituted, branched or unbranched, alkyl, aromatic, or cyclic chain, optionally containing ester, ether, amine or arnide functionalities.

8. An ink-jet ink set according to claim 1 wherein said second ink comprises multi-valent salts, said salts are selected from the group consisting of alkaline earth metals of group 2A of the periodic table; transition metals of group 3B of the periodic table; cations from group 3A of the periodic table; lanthanides; and mixtures thereof; said salt is present in an amount ranging from about 1% to about 10 by weight of said second ink.

9. An ink-jet ink set according to claim 8 wherein said multi-valent salts are selected from the group consisting of magnesium, calcium, lanthanum, aluminum, neodymium, and mixtures thereof.

10. An ink-jet ink set acco rding to claim 1 wherein said second ink comprises organic acid buffers, said organic acid has a $pK_a$ equal to or less than that of said pH-sensitive polymer of said first ink.

11. An ink-jet ink set according to claim 10 wherein said organic acid is selected from the group consisting of polyacrylic, acetic, glycolic, malonic, malic, maleic, ascorbic, succinic, glutaric, fumaric, citric, tartaric, lactic, sulfonic, and ortho-phosphoric acid, derivatives thereof, and mixtures thereof.

12. An ink-jet ink set according to claim 10 wherein said second ink comprises from about 1% to about 10%, by weight of the ink, of said organic acid.

13. An ink-jet ink set according to claim 1 wherein said first ink and said second ink are fuirther formulated with an ink-jet vehicle.

14. An inkjet ink set according to claim 1 wherein said polymer is 16:5:15:64 acrylic acid:butylaminoethyl methacrylate:octylacrylamide:methylmethacrylate, acid number 125 mg KOH/g.

15. A method of reducing bleed and halo between at least two different inks on a print medium, said at least two different inks comprising a first ink composition and a second ink composition; said method comprising the steps of:
a) formulating said first ink to comprise a pH-sensitive polymer and a self-dispersing pigment, wherein said polymer comprises monomers having the following basic structure:

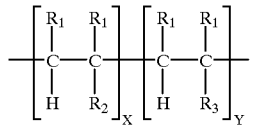

wherein $R_1$ are independently selected from H or a $C_1$–$C_{18}$ substituted or unsubstituted, branched or unbranched, alkyl, aromatic, or cyclic chain, optionally containing halogen, ester, ether, amine or amide functionalities; $R_2$ is a group selected from the group consisting of a moiety containing a carboxylic acid group, primary amine, secondary amine, tertiary amine, or mixtures thereof; and $R_3$ is a $C_1$–$C_{18}$ substituted or unsubstituted, branched or unbranched, alkyl, aromatic, or cyclic chain, optionally containing ester, ether, amine or amide functionalities, and providing that at least one N-octylacrylamide monomer, one basic amine group and one acid group are present, wherein said polymer has an acid number within a range of bout 80–200 mgKOH/g of polymer; and b) formulating said second ink to comprise a sufficient amount of a multi-valent salt which is incompatible with said pH-sensitive polymer or a sufficient amount of an organic acid such that said second ink has an appropriate pH such that when printed on a print medium and said inks come into contact, said polymer in said first ink will precipitate onto said print medium to effect a reduction in migration of said first ink into said second ink, thereby reducing bleed and halo between said at least two inks.

16. A method of reducing bleed and halo according to claim 15 wherein said first ink and said second ink are further formulated with an ink-jet vehicle.

17. A method of reducing bleed and halo according to claim 15 wherein said polymer comprises monomers with carboxylic acid functionalities selected from the group consisting of acrylic acid, methacrylic acid, crontonic acid, 2-trifluoromethylacrylic acid, 2-bromoacrylic acid, and mixtures thereof.

18. A method of reducing bleed and halo according to claim 15 wherein said polymer comprises amine functionalities and are selected from the group consisting of 2-(diethylamino)ethyl acrylate, 2-(dimethylamino)ethyl acrylate, 3-(dimethylamino)propyl acrylate, butylaminoethyl methacrylate, 2-aminoethyl methacrylate, N-acrylamide, and mixtures thereof.

19. A method of reducing bleed and halo according to claim 18 wherein the amount of basic nitrogen in said polymers, measured as the meq of basic nitrogen per gram, is from about 1 to about 7 meq/g.

20. A method of reducing bleed and halo according to claim 15 wherein said polymer comprises hydrophobic monomers selected from the group consisting of methyl esters and ethyl esters of acrylic, methacrylic acids, ethyl-2-(bromomethyl) acrylate, propyl acrylates, propyl methacrylates, butyl acrylates, butyl methacrylates, isoamyl acrylate, hexyl acrylates, hexyl methacrylates, cyclohexyl acrylates, cyclohexyl methacrylates, alkyl derivatives of cyclohexyl acrylates and methacrylates, ethylhexyl acrylates, ethylhexyl methacrylates, trimethylhexyl acrylate, isooctyl acrylate, isodecyl acrylate, dodecyl acrylate, tridecyl methacrylate, octadecyl acrylate, isobomyl acrylate, isobornyl methacrylate, phenyl methacrylate, benzyl methacrylate, 2-butoxyethyl acrylate, 2-butoxyethyl methacrylate, 2-ethoxyethyl acrylate, neopentyl glycol acrylate benzoate, ethylene glycol phenyl ether acrylate, hydroxybutyl acrylate, alkyl esters of crotonic acid, N,N-dimethylacrylamide, N-isopropylacrylamide and methacrylamide, N-octylacrylamide, N-(butoxymethyl)acrylamide, N-(isobutoxymethyl)acrylamide, methyl-2-acrylamido-2-methoxyacetate, vinyl acetate, vinyl neodecanoate, cyclohexyl vinyl ether, 2-ethylhexyl vinyl ether, styrene, and mixtures thereof.

21. A method of reducing bleed and halo according to claim 15 wherein said polymer comprises monomers having the following basic structure:

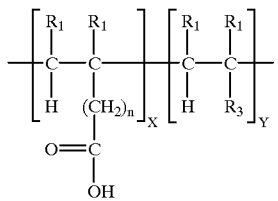

wherein $R_1$ are independently selected from H or a $C_1$–$C_{18}$ substituted or unsubstituted, branched or unbranched, alkyl, aromatic, or cyclic chain, optionally containing ester, ether, amine or amide functionalities; n is from 0 to about 15, so as long as the group has a $pK_a$ of from about 5 to about 7.5; and $R_3$ is a $C_1$–$C_{18}$ substituted or unsubstituted, branched or unbranched, alkyl, aromatic, or cyclic chain, optionally containing ester, ether, amine or amide functionalities.

22. A method of reducing bleed and halo according to claim 15 wherein said second ink comprises multi-valent salts, said salts are selected from the group consisting of alkaline earth metals of group 2A of the periodic table; transition metals of group 3B of the periodic table; cations from group 3A of the periodic table; lanthanides; and mixtures thereof; said salt is present in an amount ranging from about 1% to about 10 by weight of said second ink.

23. A method of reducing bleed and halo according to claim 22 wherein said multi-valent salts are selected from the group consisting of magnesium, calcium, lanthanum, aluminum, neodymium, and mixtures thereof.

24. A method of reducing bleed and halo according to claim 15 wherein said second ink comprises organic acid buffers, said organic acid has a $pK_a$ equal to or less than that of said pH-sensitive polymer of said first ink.

25. A method of reducing bleed and halo according to claim 24 wherein said organic acid is selected from the group consisting of polyacrylic, acetic, glycolic, malonic, malic, maleic, ascorbic, succinic, glutaric, fumaric, citric, tartaric, lactic, sulfonic, and ortho-phosphoric acid, derivatives thereof, and mixtures thereof.

26. A method of reducing bleed and halo according to claim 25 wherein said second ink comprises from about 1% to about 10%, by weight of the ink, of said organic acid.

27. A method of reducing bleed and halo according to claim 15 wherein said polymer is 16:5:15:64 acrylic acid-:butylaminoethyl methacrylate:octylacrylamide:methylmethacrylate, acid number 125 mg KOH/g.

* * * * *